United States Patent
Ehlers et al.

(10) Patent No.: US 6,856,275 B1
(45) Date of Patent: Feb. 15, 2005

(54) SEMICONDUCTOR ARTICLE HARMONIC IDENTIFICATION

(75) Inventors: Gerald L. Ehlers, Linden, VA (US); Jay P. Charters, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/033,080

(22) Filed: Dec. 26, 2001

(51) Int. Cl.$^7$ .............................................. G01S 13/74
(52) U.S. Cl. ........................ 342/42; 342/44; 340/10.42
(58) Field of Search ............................ 342/42, 44, 50, 342/51, 192–193; 340/10.42, 10.1–10.4, 10.41

(56) References Cited

U.S. PATENT DOCUMENTS

| | | | | |
|---|---|---|---|---|
| 4,344,064 A | * | 8/1982 | Bitler et al. ................. | 338/295 |
| 4,352,098 A | | 9/1982 | Stephen et al. .............. | 340/572 |
| 4,646,090 A | * | 2/1987 | Mawhinney .............. | 340/572.4 |
| 5,450,492 A | * | 9/1995 | Hook et al. ................. | 340/10.2 |
| 6,060,815 A | | 5/2000 | Nysen ......................... | 310/318 |
| 6,094,133 A | * | 7/2000 | Shimamura et al. ........ | 235/385 |
| 6,371,379 B1 | * | 4/2002 | Dames et al. ................ | 235/449 |
| 6,433,671 B1 | * | 8/2002 | Nysen ......................... | 340/10.1 |

FOREIGN PATENT DOCUMENTS

| | | | |
|---|---|---|---|
| DE | 41 17 157 A1 | 3/1993 | ........... G01S/13/74 |
| GB | 1 604 220 | 12/1981 | ............ H04B/1/59 |

OTHER PUBLICATIONS

PCT Report for PCT/US 02/40933, 8 pages, Jul. 4, 2003.

* cited by examiner

*Primary Examiner*—Thomas H. Tarcza
*Assistant Examiner*—Isam Alsomiri
(74) *Attorney, Agent, or Firm*—Baker Botts L.L.P.

(57) ABSTRACT

An harmonic intermodulation article identification system comprises a scanning dipole antenna response to an RF intermodulation harmonic product radiated from RF diodes carried by or embedded in a substrate. The product signature is applied to a spectrum analyzer that outputs a signature identification to a comparator. In response to receiving a signature identification, the comparator scans previously stored signature identifications for a match. A match indicates the received product identification from the analyzer defined a specific substrate such as a document or product tag. A match by the comparator outputs a signal to a display that indicates the identification of a substrate carrying RF diodes generating the compared product identification.

10 Claims, 1 Drawing Sheet

SEMICONDUCTOR ARTICLE HARMONIC IDENTIFICATION

TECHNICAL FIELD OF THE INVENTION

The present invention relates to harmonic article identification, and more particularly, the invention relates to identification of an article carrying at least one semiconductor device outputting an harmonic intermodulation for detection and/or identification.

BACKGROUND OF THE INVENTION

There has been significant effort in the last decade or so to develop systems for identification of products, either identification of a particular product from a product signature or identification of products moving through a defined space. This effort has resulted in a number of product identification systems utilizing various technologies to generate and evaluate product identification signals. One of the most widely used system utilizes a bar code reader response to a bar coded element carried by a product or article. As the bar coded element moves through a scanning field, the response to the scanning field changes and this change is detected. Such systems are primarily intended only for identification of products or articles moving through a defined space, although there is no technological limitation to generate identification signatures. These systems are restricted in the areas of utilization due to size and cost restraints.

Other known systems utilize transponder tags carried or otherwise attached to a product or article. Many of these transponders are expensive and have a limited range of detection, typically, less than one meter. There is no known transponder tag detection system that utilizes harmonic detection for article identification. Again, transponder tags have found limited use due to the size of the transponder and the cost of a tag that may be utilized once and discarded.

In addition to monitoring and tracking articles and products, identification systems presently in use also find utility in security applications. This includes document security where size of the tag has a more significant impact than tags used for article and product identification for monitoring and tracking. Systems presently in use for article identification including product identification and document identification do not provide a security identification signature or "fingerprint" for a document. The use of an identification signature enables the recognition of individual articles or articles in groups identified with a common identification signature.

Thus, there is a need for an article identification system utilizing a relatively inexpensive tag or detector element and having a size that does not burden the article for identification. Further, there is a need for an article identification system utilizing a tag that provides an identified signature to separate identified articles into classes.

SUMMARY OF THE INVENTION

In accordance with the present invention, there is provided an inexpensive system and method for identifying articles carrying one or more semiconductor devices that respond to RF frequencies and radiate harmonic modulation energy. An harmonic article identification tag in accordance with the present invention comprises at least one RF diode carried by an article and responsive to at least two RF frequencies to generate a third harmonic intermodulation output.

In accordance with one embodiment of the invention, an harmonic intermodulation article identification system comprises at least one semiconductor device carried by or attached to an article. The at least one semiconductor device responds to at least two RF frequencies to generate an harmonic intermodulation output. This harmonic intermodulation output RF signal is received by an antenna having an output connected to a signal analyzer. This signal analyzer responds to the analyzer signal to identify the article carrying the at least one semiconductor device.

Also in accordance with the present invention, there is provided an harmonic article identification system comprising a first signal generator operating to generate an RF signal at a first frequency and a second signal generator operating to generate an RF signal at a second frequency. At least one RF diode carried by an article responds to the first and second frequencies to generate an harmonic intermodulation output received by an antenna that generates an output to a signal analyzer. The antenna is coupled to a signal analyzer that responds to the analyzer signal to identify the article carrying the at least one RF diode.

A method for harmonic article identification in accordance with an embodiment of the present invention comprises generating at least two RF signals at separate frequencies. In response to the two separate frequencies, an harmonic intermodulation signal is generated by at least one RF diode carried by an article and responsive to the at least two separate frequencies. An analyzer signal is generated at the output of an antenna receiving the harmonic intermodulation output and this analyzer signal is analyzed to generate an article identification signature.

In addition, in accordance with the present invention, there is provided an identification system for articles carrying at least one semiconductor device that generates an harmonic intermodulation output. The identification system comprises a signal analyzer responsive to the harmonic intermodulation output to generate an article identification signal applied to a comparator. Also coupled to the comparator is a signature memory storing the article identification signatures of at least one article for identification. The comparator responds to the article identification signal from the signal analyzer and scans each of the article identification signatures stored in the signature memory. The comparator generates a signal to identify an article carrying at least one semiconductor device from the stored signatures.

Technical advantages of the present invention include an inexpensive system and method for identifying articles tagged with at least one semiconductor device. The system identifies both from far (one to three meters) and near (less than one centimeter) environments. A further advantage of the present invention is the utilization of inexpensive RF diodes and strong RF signals to detect harmonics at a distance not heretofore possible by use of near field antenna apertures to scan the article and record an identification signature to be verified. A further technical advantage of the present invention is cost reduction and expansion of opportunities for identification in areas of monitoring, tracking and security that have heretofore been prohibited due to the size and cost restraints of tags and responding systems.

DETAILED DESCRIPTION OF THE INVENTION

Although the invention will be described with reference to identification of a signature on a document, it should be understood that this is a preferred embodiment and the invention finds utility in many applications other than document signature identification. For example, and not by way of limitation, the harmonic intermodulation system and method of the present invention may be utilized for identification of the presence of a document without specifically identifying individual documents. Further, the invention finds utility in identification of the signature or presence of articles other than documents carrying at least one RF diode that generates a third harmonic intermodulation output. Thus, the invention finds utility in commercial and government uses for classified and unclassified documents and other articles.

Figure 1:
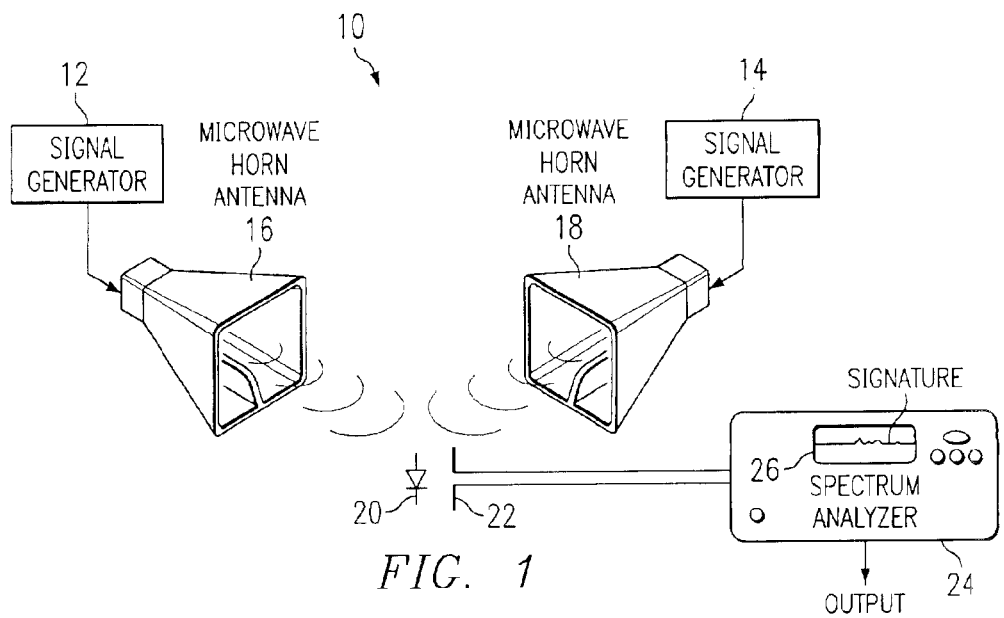
FIG. 1 is schematic diagram of an identification system utilizing microwave horn antennas radiating a semiconductor device to generate a third harmonic intermodulation signal.

Referring to FIG. 1, there is illustrated a schematic diagram of a system for identifying an RF tagged article for signature recognition of a multiple tagged article. The RF tag system 10 of FIG. 1 comprises a first frequency generator 12 generating a first frequency signal applied to a microwave horn antenna 16. A second frequency generator 14 outputs a second frequency applied to a microwave horn antenna 18. Typically, the horn antennas are positioned to radiate an RF diode 20 at right angles to the diode. In the embodiment of the invention illustrated in FIG. 1, the signal generator 12 may be a Hewlett-Packard frequency generator outputting the first frequency F1 at 24.0 GHz @ +4.0 dBm. The second signal generator 14 may also be a Hewlett Packard frequency generator outputting the second frequency F2 at 24.1 GHz @ +4.0 dBm. With a first frequency of 24.0 GHz and a second frequency of 24.1 GHz, the RF diode 20 comprises a 24.0 GHz beam lead type. Such diodes are commercially available and have a size configuration to enable embedding in a document such that the diode is not visually apparent.

Although the invention will be described with reference to a first frequency of 24.0 GHz and a second frequency of 24.1 GHz, it should be understood that this is a preferred embodiment and other RF frequencies may be used in implementation of the invention.

Radiating the diode 20 with the first frequency from the signal generator 12 and the second frequency from the signal generator 14 results in the diode producing a third order intermodulation product. This harmonic signal is detected by a dipole antenna 22 that outputs an analyzer signal to a spectrum analyzer 24. In one embodiment of the invention, the dipole antenna 22 comprises a dipole having a length of one wavelength at the output of either the signal generator 12 or the signal generator 14. The spectrum analyzer 24 responds to the analyzer signal to generate a signature display 26 that identifies the presence of the diode 20 and the intermodulation output. The spectrum analyzer 24 also outputs a signature signal for additional processing of the analyzer signal from the dipole antenna 22.

In operation of the system of FIG. 1, the signal generator 12 outputs a frequency at 24.0 GHz and the signal generator 14 outputs a 24.1 GHz frequency. These two frequencies are applied to the horn antennas 16 and 18, respectively, to radiate the RF diode 20 thereby generating a third order intermodulation product detected by the dipole receiver antenna 22. For the specific frequencies of 24.0 GHz and 24.1 GHz, the third order intermodulation product would be two RF frequencies at 23.9 GHz and 24.2 GHz. When the first frequency F1 is 24.0 GHz and the second frequency F2 is 24.1 GHz, then the analyzer signal from the dipole antenna 22 varies in accordance with the expression 2F1−F2=23.9 GHz or in accordance with the expression 2F2F1=24.2 GHz. With power levels from the signal generators 12 and 14 of approximately +4.0 dBm, the spectrum analyzer 24 responds to third order intermodulation products in the −100 dBm range.

Figure 2:
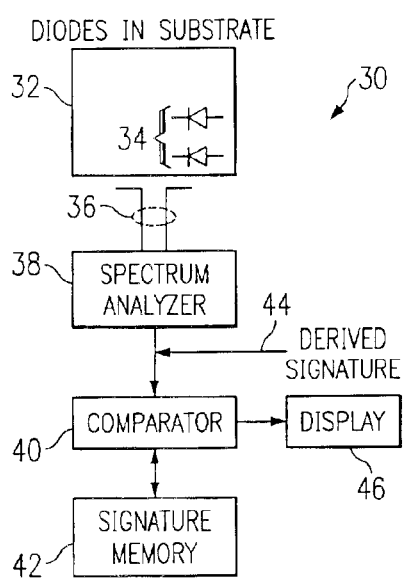
FIG. 2 is a block diagram of a signal analysis system responsive to a third harmonic intermodulation signal to identify a substrate.

Referring to FIG. 2, there is illustrated a block diagram of an RF tagging system 30 for identification of RF diode signatures in a substrate 32, such as a document or article tag. One or more RF diodes 34 are embedded in or carried by the substrate 32 in a selected "x-y" coordinate position. The one or more diodes 34 are radiated by frequency signals from RF frequency generators, such as signal generators 12 and 14 of FIG. 1. Radiating the one or more RF diodes 34 creates a signature intermodulation output that uniquely identifies the document carried by the diodes. In addition, the x-y coordinate position of the diodes 34 on the substrate 32 provides further authentication of the substrate. Thus, the signature of the radiated RF diodes 34 identifies the substrate, for example, a document or tag, and the x-y coordinate position of the diodes authenticates the signature.

Due to the square law characteristic of high frequency RF diodes, when the diodes 34 are exposed to a radiated RF field from signal generators 12 and 14, the diodes will both produce and re-radiate harmonic related RF energy. This re-radiated RF harmonic energy, for example, a third harmonic intermodulation product, is received by a scanning dipole antenna 36. As the substrate 32 passes in proximity to the scanning dipole antenna 36, the antenna identifies the x-y coordinate position of the diodes 34 and also responds to the signature identification resulting from the radiation of the diodes. This diode position information and the signature identification received by the dipole antenna 36 is applied to a spectrum analyzer 38. The spectrum analyzer 38 responds to the applied position information and signature identification to output a spectrum analyzer signal coupled to a comparator 40. Also coupled to the comparator 40 is a signature memory 42 that stores signature identification data for all substrates (documents, tags) to be identified by the system. The signature identifications stored in the memory 42 are pre-programmed into the system by applying signature identification data on a line 44 coupled to the comparator 40.

When the comparator 40 receives position information and a signature identification from the spectrum analyzer 38, the data stored in the signature memory 42 is scanned and when a comparison results the comparator 40 outputs an identification signal to a display 46. The display 46 comprises a visual presentation or hard copy printout identifying the substrate 32 and authenticating the substrate.

Figure 3:
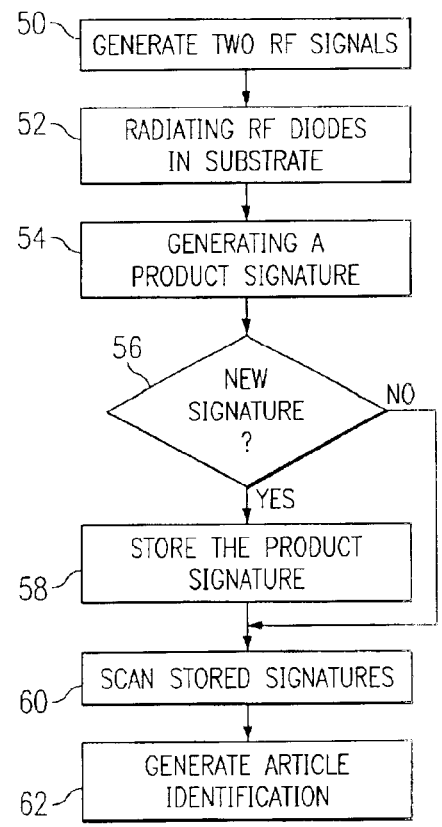
FIG. 3 is a flow diagram of the process for generating article identification utilizing two RF signals for radiating RF diodes in a substrate for identification.

Referring to FIG. 3, there is illustrated a flow diagram of the process for identifying RF tagged articles. Two RF signals are generated at an initial process sequence 50. These two RF frequency signals are applied to microwave horn antennas 16 and 18 to radiate RF diodes during process sequence 52. The RF diodes carried by or embedded in a document, tag or other substrate radiate third order intermodulation products received by a dipole antenna to generate a product signature at process sequence 54. The product signature is applied to an inquiry sequence 56 to evaluate if the product signature is a new signature not previously received. A positive response to the inquiry sequence 56 directs the product signature to a memory during a store process sequence 58.

A negative response to the inquiry sequence 56, indicating that the product signature from the process sequence 54 is not new, advances the process for article identification to a scanning process sequence 60. During the scanning process sequence 60, the product signature from the process sequence 54 is compared with the store product signatures in the scanning process sequence 60. A positive comparison between an incoming product signature and one of the stored product signatures advances the identification process to generate an article identification during a process sequence 62.

In addition to document identification by product signature, the process of FIG. 3 also finds utility in identification of the authenticity of a document. Instead of the document carrying one or more embedded RF diodes defining a product signature, the document would carry only one RF diode. The process of FIG. 3 is modified to remove the process sequences 56, 58 and 60 and the product signature from the process sequence 54 comprises a signal identifying the presence of an RF diode in a document. The presence of the RF diode in the document is an indication of authenticity of the document as generated in the process sequence 62.

While the invention has been described with reference to the illustrated preferred embodiment, it is intended to cover such alternatives, modifications and equivalents as may be included in the spirit and scope of the invention as defined in the following claims.

What is claimed is:

1. An harmonic article identification system, comprising:
a first signal generator operating to generate an RF signal at a first frequency;
a second signal generator operating to generate an RF signal at a second frequency;
two or more RF diodes carried by an article and responsive to the first and second frequencies to generate an harmonic signal;
an antenna receiving the harmonic signal and, in response to receiving the harmonic signal, generating an analyzer signal;
a signal analyzer coupled to the antenna and responsive to the analyzer signal to identify the article;
wherein the analyzer signal from the receiving antenna to the signal analyzer comprises a subtraction of the first frequency signal from twice the second frequency signal.

2. The harmonic article identification system as in claim 1 wherein the two or more RF diodes comprise a signature identification of the article.

3. The harmonic article identification system as in claim 1 wherein the at least two or more RF diodes respond to RF signals in a frequency range from about 24.0 GHz to about 24.1 GHz.

4. The harmonic article identification system as in claim 1 wherein the antenna comprises a dipole having a wavelength determined by either the first frequency or the second frequency.

5. An harmonic article identification system, comprising:
a first signal generator operating to generate an RF signal at a first frequency;
a second signal generator operating to generate an RF signal at a second frequency;
two or more RF diodes carried by an article and responsive to the first and second frequencies to generate an harmonic signal;
an antenna receiving the harmonic signal and, in response to receiving the harmonic signal, generating an analyzer signal;
a signal analyzer coupled to the antenna and responsive to the analyzer signal to identify the article;
wherein the analyzer signal from the receiving antenna to the signal analyzer varies in accordance with the expression:

$$2F1-F2,$$

wherein:
F1 equals the first frequency, and
F2 equals the second frequency.

6. An harmonic article identification system, comprising:
a first signal generator operating to generate an RF signal at a first frequency;
a second signal generator operating to generate an RF signal at a second frequency;
two or more RF diodes carried by an article and responsive to the first and second frequencies to generate an harmonic signal;
an antenna receiving the harmonic signal and, in response to receiving the harmonic signal, generating an analyzer signal;
a signal analyzer coupled to the antenna and responsive to the analyzer signal to identify the article;
wherein the analyzer signal from the receiving antenna to the signal analyzer comprises a subtraction of the second frequency signal from twice the first frequency signal.

7. An harmonic article identification system, comprising:
a first signal generator operating to generate an RF signal at a first frequency;
a second signal generator operating to generate an RF signal at a second frequency;
two or more RF diodes carried by an article and responsive to the first and second frequencies to generate an harmonic signal;
an antenna receiving the harmonic signal and, in response to receiving the harmonic signal, generating an analyzer signal;
a signal analyzer coupled to the antenna and responsive to the analyzer signal to identify the article;
wherein the analyzer signal from the receiving antenna to the signal analyzer varies in accordance with the expression:

$$2F2-F1,$$

wherein:
F1 is the first frequency, and
F2 is the second frequency.

8. An harmonic article identification system, comprising:
a first signal generator outputting an RF signal at a frequency of 24.0 GHZ;
a second signal generator outputting an RF signal at a frequency of 24.1 GHZ;
two or more RF diodes carried by an article and responsive to the 24.0 GHZ frequency and the 24.1 GHZ frequency to generate an harmonic signal;
a dipole antenna receiving the harmonic signal and, in response to the dipole antenna receiving the harmonic signal generating an analyzer signal varying in accordance with the expression:

$$2F1-F2,$$

wherein:
F1 equals the 24.0 GHZ frequency, and
F2 equals the 24.1 GHZ frequency; and a signal analyzer coupled to the dipole antenna and responsive to the analyzer signal to identify the article.

9. An harmonic article identification system, comprising:

a first signal generator outputting an RF signal at a frequency of 24.0 GHZ;

a second signal generator outputting an RF signal at a frequency of 24.1 GHZ;

two or more RF diodes carried by an article and responsive to the 24.0 GHZ frequency and the 24.1 GHZ frequency to generate an harmonic signal having a third order intermodulation product;

a dipole antenna receiving or any other tuned antenna receiving the harmonic signal and, in response to the dipole antenna receiving the harmonic signal, generating an analyzer signal varying in accordance with the expression:

$$2F2-F1,$$

wherein:
F1 equals the 24.0 GHZ frequency, and
F2 equals the 24.1 GHZ frequency; and a signal analyzer coupled to the dipole antenna and responsive to the analyzer signal to identify the article.

10. An harmonic article identification tag, comprising:

at least one RF diode carried by an article and responsive to at least two RF signals to generate an harmonic signal having a third order intermodulation product defined by the expression of twice a first one of the two RF signals less a second one of the two RF signals, the at least one diode generating harmonic signal characteristics for RF article identification.

* * * * *